United States Patent
Cole et al.

(10) Patent No.: US 11,802,584 B2
(45) Date of Patent: Oct. 31, 2023

(54) FOREIGN MATERIAL EXCLUSION PLUG FOR STRUCTURAL THREADS WITH BREAKAWAY TAB

(71) Applicant: Consolidated Nuclear Security, LLC, Oak Ridge, TN (US)

(72) Inventors: Robert N. Cole, Knoxville, TN (US); Kevin P. Shay, Knoxville, TN (US); Austin L. Renfro, Knoxville, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 450 days.

(21) Appl. No.: 16/988,846

(22) Filed: Aug. 10, 2020

(65) Prior Publication Data

US 2022/0042540 A1 Feb. 10, 2022

(51) Int. Cl.
*F16B 37/12* (2006.01)
*F16B 23/00* (2006.01)
*F16B 31/02* (2006.01)

(52) U.S. Cl.
CPC ........ *F16B 37/125* (2013.01); *F16B 23/0015* (2013.01); *F16B 31/021* (2013.01)

(58) Field of Classification Search
CPC ............... F16B 31/021; F16B 23/0015; F16B 23/0007; F16B 23/0023; F16B 35/065; F16B 35/06
USPC ...................................... 411/2, 3, 5, 403–405
See application file for complete search history.

(56) References Cited

U.S. PATENT DOCUMENTS

| | | | |
|---|---|---|---|
| 4,109,691 A * | 8/1978 | Wilson | F16B 31/021 411/3 |
| 4,199,216 A * | 4/1980 | Gryctko | H01R 4/36 439/814 |
| 4,301,629 A | 11/1981 | Farr | |
| 4,807,415 A | 2/1989 | Oak | |
| 5,103,615 A | 4/1992 | Owens | |
| 5,271,519 A | 12/1993 | Adams et al. | |
| 5,499,737 A | 3/1996 | Kraus | |
| 5,649,782 A * | 7/1997 | Frohlich | B28B 23/005 403/301 |
| 5,660,302 A | 8/1997 | Trout | |
| 5,702,133 A | 12/1997 | Pavur et al. | |
| 6,290,279 B1 | 9/2001 | Haight et al. | |
| 7,581,361 B1 | 9/2009 | Murkland | |
| 8,556,556 B2 * | 10/2013 | Tedeschi | F16B 31/021 411/411 |
| 9,080,590 B2 * | 7/2015 | Van Cor | F16B 35/06 |
| 11,058,469 B2 * | 7/2021 | Mahajan | A61B 17/8615 |

* cited by examiner

*Primary Examiner* — Flemming Saether
(74) *Attorney, Agent, or Firm* — Clements Bernard Walker; Christopher L. Bernard; Christine Wilkes Beninati

(57) ABSTRACT

A foreign material exclusion plug is disclosed. The foreign material plug includes a cylindrical body, a slot, and a breakaway tab. The cylindrical body includes an externally-threaded cylindrical structure. The slot is formed in the cylindrical body extending into the cylindrical body from a top surface of the cylindrical body. The breakaway tab is connected to the cylindrical body and extends outwards from the top surface.

14 Claims, 5 Drawing Sheets

FOREIGN MATERIAL EXCLUSION PLUG FOR STRUCTURAL THREADS WITH BREAKAWAY TAB

STATEMENT REGARDING GOVERNMENT RIGHTS

The U.S. Government has certain rights to the present disclosure pursuant to Contract No. DE-NA0001942 between the U.S. Department of Energy and Consolidated Nuclear Security, LLC.

TECHNICAL FIELD

The present disclosure generally relates to plugs for excluding foreign materials. More particularly, the present disclosure relates to systems and methods for foreign material exclusion plugs for structural threads with a breakaway tab.

BACKGROUND

Threaded couplers, such as bolt couplers, are often embedded into the floor of a facility, such as a warehouse. These embedded threaded couplers are installed for future expansion and installation of components, such as structural steel, machinery, and the like. Temporary plastic caps are generally inserted into the embedded threaded couplers. However, these temporary plastic caps are easily damaged and easily displaced by traffic on the floor of the facility during general operations therein. The resulting damage requires continuous repairs of the temporary plastic caps and other mitigation efforts, such as the use of tape, to retain the temporary plastic caps within the embedded threaded couplers.

Due to the common displacement of the temporary plastic caps, spot checks of the temporary plastic caps are needed to ensure that the temporary plastic caps are properly positioned within the embedded threaded couplers. Furthermore, upon displacement or loss of seal due to damage, foreign material, such as debris, dust, small objects, concrete and other undesirable material that enters the embedded threaded coupler, can result in damage to the internal threading of the embedded threaded couplers. Such damage can prevent the use of those embedded threaded couplers in the future expansion and installation of components within the facility. Damage to the embedded threaded couplers would require costly and intrusive repairs, such as the excavation of the concrete and the replacement of the embedded threaded couplers.

The above-described background relating to embedded threaded couplers is merely intended to provide a contextual overview of some current issues and is not intended to be exhaustive. Other contextual information may become apparent to those of ordinary skill in the art upon review of the following description of illustrative embodiments.

SUMMARY

The present disclosure generally provides a foreign material exclusion plug. The exclusion plug includes a breakaway tab and a slot. The breakaway tab facilitates tool-less installation as the breakaway tab is used to thread the foreign material exclusion plug into a threaded coupler, such as a bolt coupler, embedded into the floor of a facility. Upon coupling of the foreign material exclusion plug into the threaded coupler, the breakaway tab is broken off from a cylindrical body of the foreign material exclusion plug. With the breakaway tab removed after installation in a facility, the top surface of the foreign material exclusion plug is left flush with the floor of the facility and protects the embedded threaded couplers from entry of debris, dust, and small objects that can damage the internal threads therein.

The slot facilitates easy removal of the foreign material exclusion plug from the threaded coupler using a tool, such as a screwdriver, a coin, or the previously removed breakaway tab.

In one illustrative embodiment, the present disclosure provides a foreign material exclusion plug. The foreign material exclusion plug includes a cylindrical body, a slot, and a breakaway tab. The cylindrical body includes an externally-threaded cylindrical structure. The slot is formed in the cylindrical body extending into the cylindrical body from a top surface of the cylindrical body. The breakaway tab is connected to the cylindrical body and extends out from the top surface in a direction non-parallel to, and typically perpendicular to, the top surface.

In some embodiments, the breakaway tab is integrally formed with the cylindrical body as a unitary structure. In some embodiments, the breakaway tab is oriented such that the breakaway tab crosses over the slot and is integrally connected to the cylindrical body on one of opposing sides and opposing ends of the slot. In other embodiments, the breakaway tab is oriented such that the breakaway tab does not cross over the slot while integrally connected to the cylindrical body.

In some embodiments, the breakaway tab is adapted to break off from the cylindrical body at a base thereof, the base adjoining the top surface of the cylindrical body. The breakaway tab is adapted to break off from the cylindrical body upon application of a predetermined force.

In some embodiments, the slot is adapted to receive at least one of an end of a tool, a coin, and a portion of the breakaway tab broken off from the cylindrical body.

In some embodiments, the foreign material exclusion plug further includes a flange radially extending from the cylindrical body at the top surface. Optionally, the flange includes one of a cylindrical structure and a frusto-conical structure. Optionally, the flange includes a thread boss facing at least partially in the cylindrical direction, and wherein an external thread of the externally-threaded cylindrical structure extends to the thread boss.

In another illustrative embodiment, the present disclosure provides a coupling system. The coupling system includes a structural threaded coupler and a foreign material exclusion plug. The structural threaded coupler includes an internally threaded portion with an internally-threaded cylindrical structure. The foreign material exclusion plug includes a cylindrical body, a slot, and a breakaway tab. The cylindrical body includes an externally-threaded cylindrical structure adapted to thread into the internally-threaded cylindrical structure. The slot is formed in the cylindrical body extending into the cylindrical body from a top surface of the cylindrical body. The breakaway tab is connected to the cylindrical body and extends out from the top surface in a direction non-parallel to, and typically perpendicular to, the top surface. The breakaway tab is integrally formed with the cylindrical body as a unitary structure, is adapted to receive a force to thread the foreign material plug into the structural threaded coupler, and is adapted to break off from the cylindrical body at a base thereof. The base adjoins the top surface of the cylindrical body. The slot is adapted to receive at least one of an end of a tool, a coin, and a portion of the breakaway tab broken off from the cylindrical body for unthreading the foreign material exclusion plug from the structural threaded coupler.

In some embodiments, the breakaway tab is oriented such that the breakaway tab crosses over the slot and is integrally connected to the cylindrical body on one of opposing sides and opposing ends of the slot. In other embodiments, the breakaway tab is oriented such that the breakaway tab does not cross over the slot while integrally connected to the cylindrical body. The breakaway tab is adapted to break off from the cylindrical body upon application of a predetermined force.

In some embodiments, the foreign material exclusion plug further comprises a flange radially extending from the cylindrical body at the top surface, and the structural threaded coupler further comprises a flush mount portion adapted to receive the flange. Optionally, the flange includes one of a cylindrical structure and a frusto-conical structure, and the flush mount portion includes one of a counterbore with a flat bottomed enlargement of the internally threaded portion and a countersink with a conical enlargement of the internally threaded portion. Optionally, the flange includes a thread boss facing at least partially in the cylindrical direction, an external thread of the externally-threaded cylindrical structure extends to the thread boss, and the thread boss is adapted to engage an internal thread of the internally threaded portion and lock the foreign material exclusion plug in place relative to the structural threaded coupler. And optionally, the breakaway tab is adapted to break off from the cylindrical body upon application of a force while the thread boss is engaged with the internal thread.

In yet another illustrative embodiment of the present disclosure, a method for coupling a structural threaded coupler to a foreign material exclusion plug is disclosed. The method includes providing the structural threaded coupler including an internally threaded portion with an internally-threaded cylindrical structure. The method also includes providing the foreign material exclusion plug comprising a cylindrical body including an externally-threaded cylindrical structure, a slot formed in the cylindrical body extending into the cylindrical body from a top surface of the cylindrical body, and a breakaway tab connected to the cylindrical body and extending out from the top surface in a direction non-parallel to, and typically perpendicular to, the top surface, the breakaway tab being integrally formed with the cylindrical body as a unitary structure. The method further includes threading the cylindrical body into the internally threaded portion by applying a force to the breakaway tab such that the foreign material exclusion plug turns relative to the structural threaded coupler.

In some embodiments, the method yet further includes breaking the breakaway tab off from the cylindrical body at a base of the breakaway tab after the cylindrical body is threaded into the internally threaded structure.

In some embodiments, the foreign material exclusion plug further comprises a flange radially extending from the cylindrical body at the top surface, the flange includes a thread boss facing at least partially in the cylindrical direction, an external thread of the externally-threaded cylindrical structure extends to the thread boss, the structural threaded coupler further comprises a flush mount portion adapted to receive the flange. In these embodiments, threading the cylindrical body into the internally threaded portion includes applying the force until the thread boss engages an internal thread of the internally threaded portion and locks the foreign material exclusion plug in place relative to the structural threaded coupler, and breaking the breakaway tab off from the cylindrical body includes applying the force to the breakaway tab after the thread boss engages the internal thread.

In some embodiments, the method still further includes uncoupling the foreign material exclusion plug from the structural threaded coupler by inserting one of an end of a tool, a coin, and the breakaway tab broken off from the cylindrical body into the slot and applying a force to thereto such that the foreign material exclusion plug turns relative to the structural threaded coupler.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF EMBODIMENTS

In various embodiments, the present disclosure relates to systems and methods for a foreign material exclusion plug that is a compact, robust plug for structural threaded couplers. Structural threaded couplers are typically embedded in the floor of a facility, such as a warehouse. The foreign materials exclusion plug of the present disclosure includes an externally-threaded cylindrical structure, a breakaway tab, and a slot.

The breakaway tab facilitates tool-less mating between the foreign material exclusion plug and the structural threaded coupler as the breakaway tab is adapted to receive a torsional force for threading the externally-threaded cylindrical structure of the foreign materials exclusion plug into the structural threaded coupler. Further, the breakaway tab is adapted to break off from a top surface of the foreign material exclusion plug leaving a flat surface that is flush (save for the slot) with the floor of the facility. The slot remains and facilitates removal of the foreign material exclusion plug.

While installed, the foreign material exclusion plug prevents debris, dust, and small objects from entering into the structural threaded coupler, which protects the internal threads of the structural threaded coupler from being damaged.

Figure 1A:
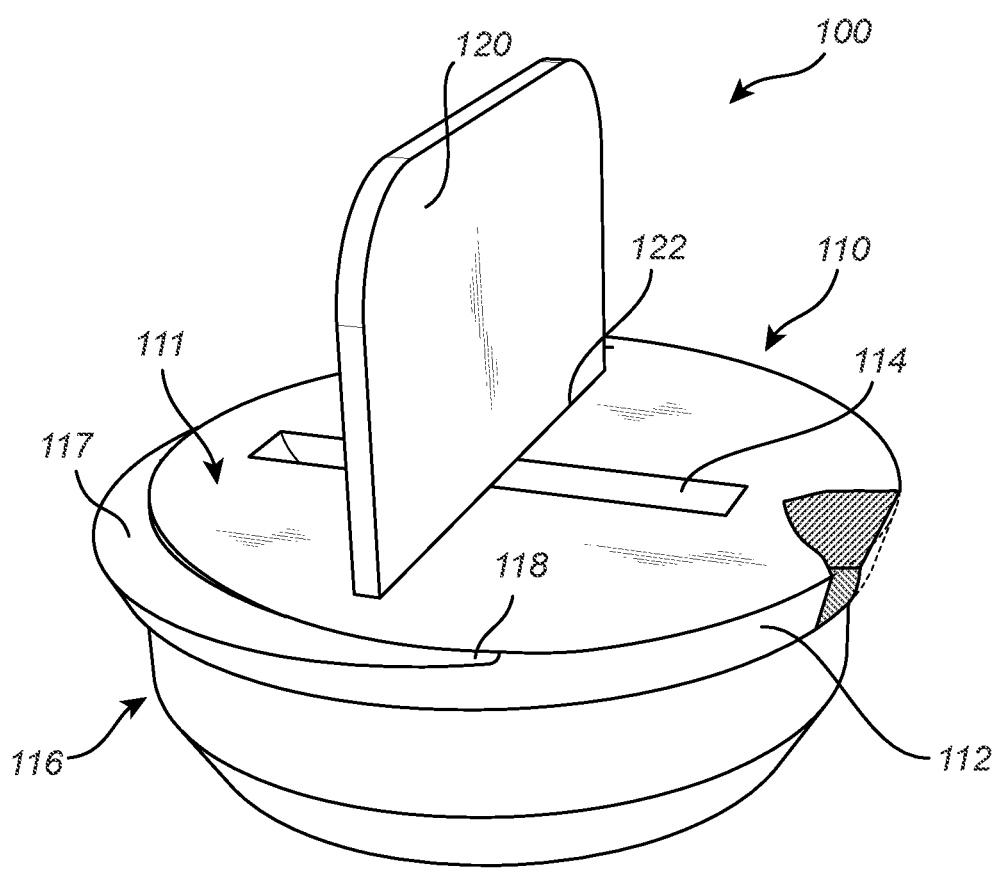
FIG. 1A and FIG. 1B are each a perspective view of an illustrative embodiment of a foreign material exclusion plug.
Figure 1B:
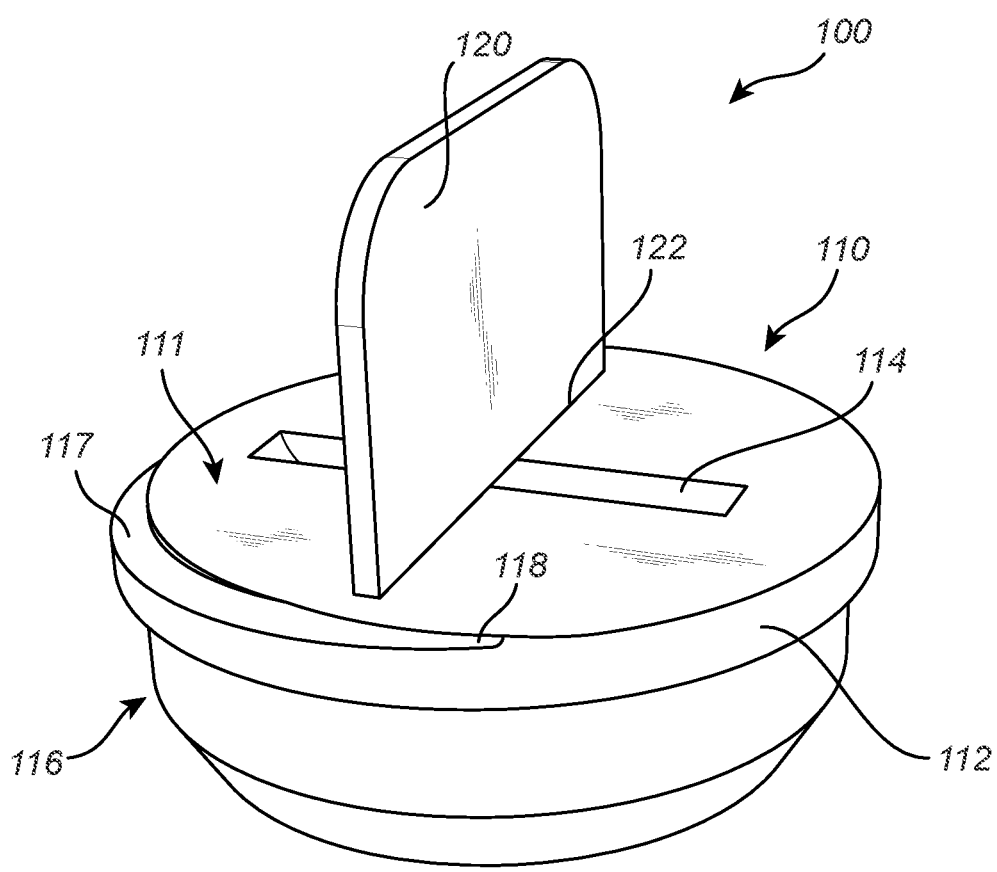

FIG. 1A and FIG. 1B are each a perspective view of an illustrative embodiment of a foreign material exclusion plug 100. Referring to FIGS. 1A and 1B, the foreign material exclusion plug 100 includes a cylindrical body 110, a slot 114, and a breakaway tab 120. In the embodiment illustrated, the cylindrical body 110 includes an externally-threaded portion 116 and a flange 112.

The externally-threaded portion 116 includes an externally-threaded cylindrical structure with external threads 117. In some embodiments, the external threads 117 are structural threads and are adapted to thread to the structural threads of a structural threaded coupler. In one embodiment, the external threads 117 are ¼ inch of male thread. However, other types of threading and thread spacing are contemplated, such as those for standard structural bolt sizes and thread pitches, tapered threads, and the like.

The flange 112 extends radially from the cylindrical body 110 at a top surface 111 of the cylindrical body 110. In some embodiments, the flange 112 includes one of a cylindrical structure and a frusto-conical structure (FIG. 1A). In some embodiments, the flange 112 includes a thread boss 118. In embodiments, the thread boss 118 faces at least partially in the cylindrical direction relative to an axis of the cylindrical body 110. Further, in embodiments, an external thread 117 extends to the thread boss 118. Thus, in embodiments, the external thread 117 extends into the flange 112 and to the top surface 111.

The slot 114 is formed in the cylindrical body 110 and extends into the cylindrical body 110 from the top surface 111 of the cylindrical body 110. The slot 114 is adapted to receive at least one of an end of a tool, a coin, and a portion of the breakaway tab 120 broken off from the cylindrical body 110. In embodiments, the tool is a tool capable of applying a torsional force, such as a screwdriver and the like. The coin is a standard coin, such as a quarter, nickel, and the like.

As such, in embodiments, a length and a width of the slot are sized to be larger than the end of the tool. The width of the slot is sized to be wider than the thickness of a standard coin. And the length and the width of the slot are sized to be larger than a length and a thickness of the breakaway tab 120, and in particular, a distal end 124 (FIG. 3) of the breakaway tab 120.

The breakaway tab 120 is connected to the cylindrical body 110 and extends out from the top surface 111 in a direction perpendicular to the top surface 111. In some embodiments, the breakaway tab is integrally formed with the cylindrical body as a unitary structure. For example, in embodiments, the foreign material exclusion plug and all of the components thereof are manufactured using an additive manufacturing process such that the breakaway tab is unitarily formed with the cylindrical body 110.

In some embodiments, the breakaway tab 120 is oriented such that the breakaway tab 120 crosses over the slot 114 and is integrally connected to the cylindrical body 110 on one of opposing sides and opposing ends of the slot 114. In the embodiment illustrated, the breakaway tab 120 is oriented perpendicular to the slot 114 and is connected to the cylindrical body 110 on each of opposing sides of the slot 114. However, in other embodiments, the breakaway tab 120 is parallel to the slot 114, extends substantially the length of the slot, and is connected to the cylindrical body on each of opposing ends of the slot 114. Orientations where the breakaway tab 120 and the slot 114 are oriented at other angles are also contemplated.

In the embodiment illustrated, each of the slot 114 and the breakaway tab 120 are perpendicular to and align with the axis of the cylindrical body 110. However, in some embodiments, at least one of the slot 114 and the breakaway tab 120 are offset from the axis.

The breakaway tab 120 is adapted to break off from the cylindrical body 110 at a base 122 of the breakaway tab 120. The base 122 adjoins the top surface 111 of the cylindrical body 110. In embodiments, the breakaway tab 120 is adapted to break off from the cylindrical body 110 upon application of a predetermined force. In embodiments, the predetermined force is greater than a force required to thread the foreign material exclusion plug 100 into a threaded coupler. In embodiments, the predetermined force for breaking off the breakaway tab 120 is established by an amount of material at the base 122 of the breakaway tab 120. For example, a thickness of the base 122 and a length of the base 122 are selected based on the structural strength provided thereby, such that the predetermined force will overcome the structural strength by one of the application of a torsional force and the application of a lateral force. Further, in embodiments, the base 122 includes one or more holes, perforations, slots, and the like, to reduce the amount of material connecting the base 122 to the top surface 111 of the cylindrical body 110.

In embodiments, the base 122 includes less material than other portions of the breakaway tab 120 to ensure that the breakaway tab 120 breaks off at the base 122. For example, in some embodiments, the base 120 has a narrower thickness than other parts of the breakaway tab 120. In any event, the user twists the breakaway tab 120 to thread the cylindrical body 110 into the structural threaded coupler via the applied torque, which the breakaway tab 120 can withstand by design. To remove the breakaway tab 120, a greater torque is applied after cylindrical body seating, or the breakaway tab 120 is subjected to a lateral force in a direction in which the breakaway tab 120 is intentionally made relatively weaker, thereby breaking the breakaway tab 120 off. When made by an additive manufacturing technique, the breakaway tab-to-cylindrical body interface plane is a layer-to-layer fusion plane, which provides a clean separation plane.

In some embodiments, the distal end 124 has a length and a thickness that is less than a length and a width of the slot 114. As such, in these embodiments, the distal end 124 of the breakaway tab 120 is receivable in the slot 114 and is usable for applying the requisite force for removing the foreign material exclusion plug from the structural threaded coupler.

In some embodiments, the foreign material exclusion plug 100 includes an annular slot for receiving a gasket, such as an O-ring and the like. In embodiments, the annular slot is positioned in the flange 112 or in the cylindrical body, such as at a base of the flange 112.

Figure 2:
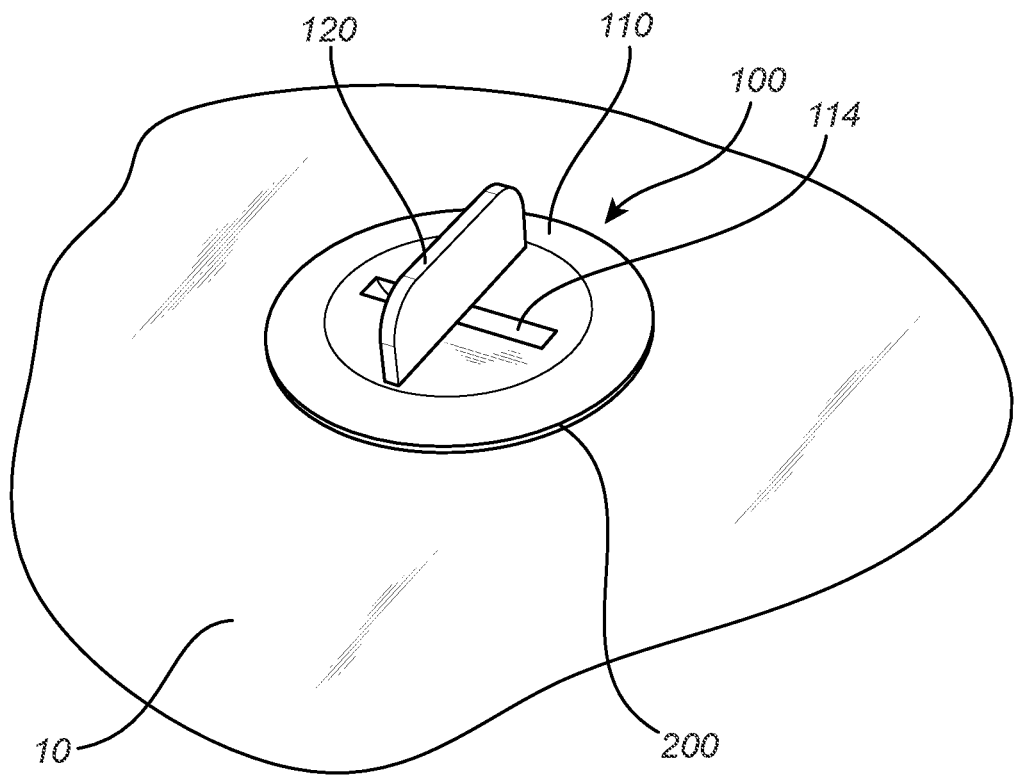
FIG. 2 is a perspective view of the foreign material exclusion plug of FIG. 1B threaded into an embedded threaded coupler.
Figure 3:
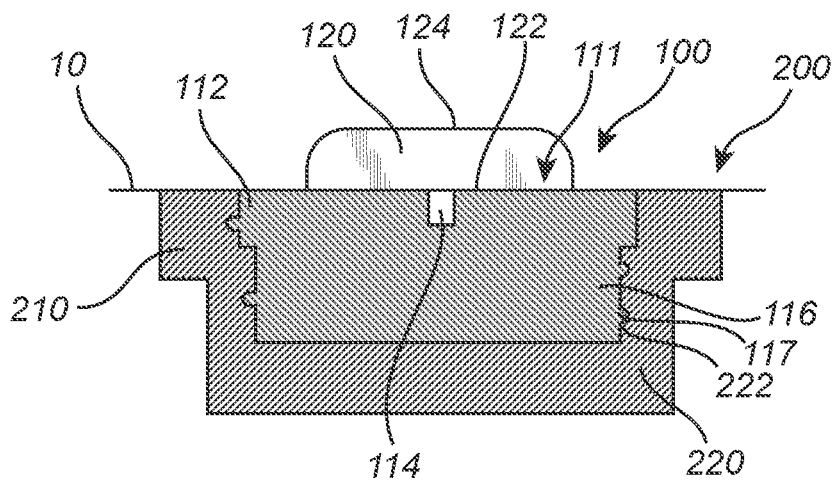
FIG. 3 is a cross-sectional view of the foreign material exclusion plug threaded into the embedded threaded coupler of FIG. 2.

FIG. 2 is a perspective view of the foreign material exclusion plug 100 of FIG. 1B threaded into an embedded threaded coupler 200. FIG. 3 is a cross-sectional view of the foreign material exclusion plug 100 threaded into the embedded threaded coupler 200 of FIG. 2. Referring to FIGS. 2 and 3, the embedded threaded coupler 200 includes an internally-threaded portion 220 with an internally-threaded cylindrical structure. In embodiments, the embedded threaded coupler 200 is a structural threaded coupler.

As can be seen in FIG. 3, the externally-threaded cylindrical structure of the cylindrical body 110 is adapted to thread into the internally-threaded cylindrical structure of the internally-threaded portion 220.

In embodiments, the embedded threaded coupler 200 includes a flush mount portion 210 adjoining the internally-threaded portion 220. The flush mount portion 210 is adapted to receive the flange 112 such that the top surface 111 is flush with the floor 10 of a facility, such as a factory. In some of these embodiments, the flush mount portion 210 includes one of a counterbore with a flat bottomed enlargement of the internally threaded portion 220 and a countersink with a conical enlargement of the internally threaded portion 220. The structure of the flange 112 is based on the structure of the flush mount portion 210.

Referring to FIG. 3, in embodiments where the flange 112 includes the threaded boss 118, the thread boss 118 is adapted to engage an internal thread 222 of the internally threaded portion 220 and lock the foreign material exclusion plug 100 in place relative to the embedded threaded coupler 200. As the external thread 117 extends into the flange 112 and to the thread boss 118 in these embodiments, the internal thread 222 similarly extends into the flush mount portion 210.

In some embodiments, the breakaway tab 120 is adapted to break off from the cylindrical body 110 upon application of a force while the thread boss 118 is engaged with the internal thread 222. In embodiments, this force is the predetermined force discussed above.

Figure 4:
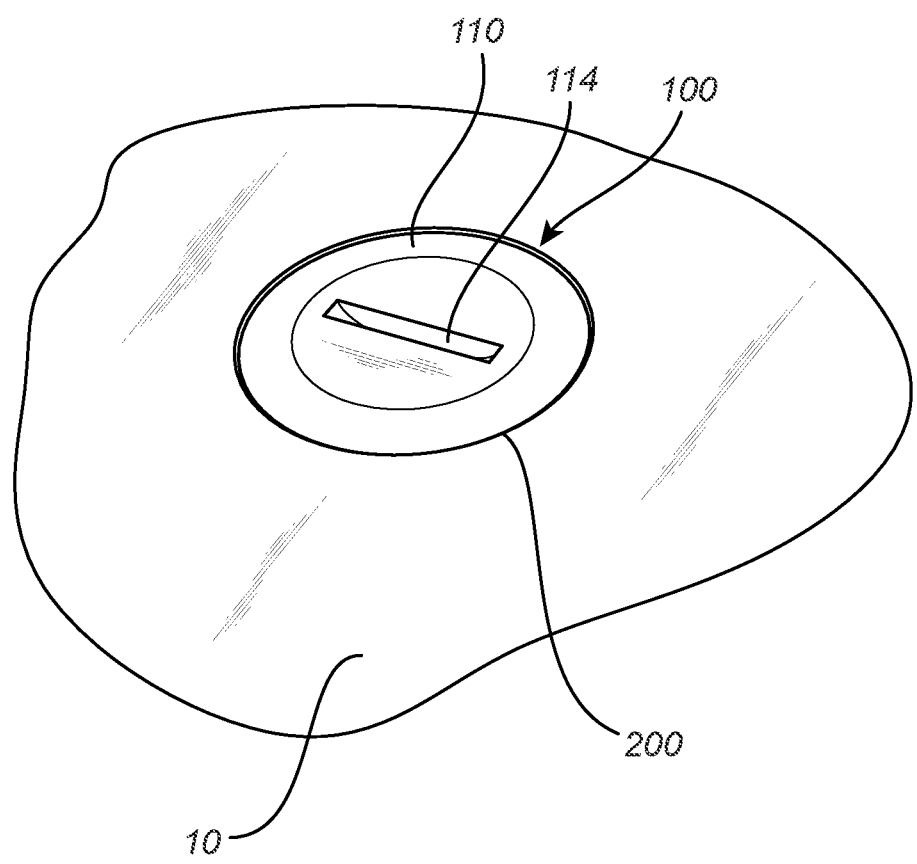
FIG. 4 is a perspective view of the foreign material exclusion plug threaded into the embedded threaded coupler of FIGS. 2 and 3 with the breakaway tab broken off.

FIG. 4 is a perspective view of the foreign material exclusion plug 100 threaded into the embedded threaded coupler 200 of FIGS. 2 and 3 with the breakaway tab 120 broken off. As can be seen in FIG. 4, upon removal of the breakaway tab 120, the foreign material exclusion plug 100 is received into the embedded threaded coupler 200 and is flush with the floor 10 of the facility.

Figure 5:
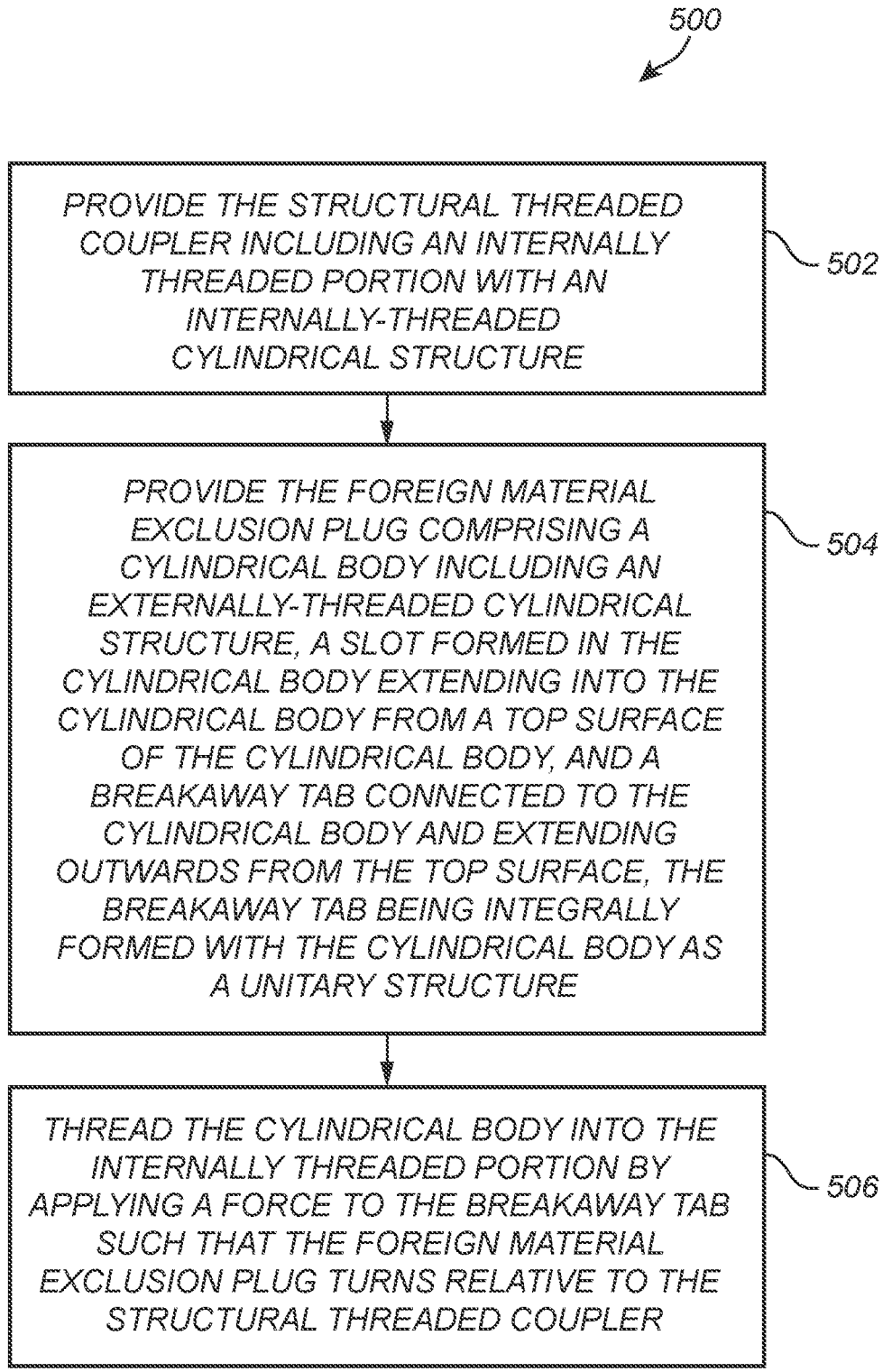
FIG. 5 is a flowchart of a method for coupling a foreign material exclusion plug 100 to a structural threaded coupler.

FIG. 5 is a flowchart of a method 500 for coupling a foreign material exclusion plug 100 to a structural threaded coupler 200. The method 500 includes providing the structural threaded coupler 200 including an internally threaded portion 220 with an internally-threaded cylindrical structure at step 502. The method 500 also includes providing the foreign material exclusion plug 100 including a cylindrical body 110 with an externally-threaded cylindrical structure, a slot 114 formed in the cylindrical body 110 extending into the cylindrical body 110 from a top surface 111 of the cylindrical body 110, and a breakaway tab 120 connected to the cylindrical body 110 and extending perpendicularly outwards from the top surface 111 at step 504. The breakaway tab 120 is integrally formed with the cylindrical body 110 as a unitary structure. The method 500 further includes threading the cylindrical body 110 into the internally threaded portion 220 by applying a force to the breakaway tab 120 such that the foreign material exclusion plug 100 turns relative to the structural threaded coupler 200.

In some embodiments, the method 500 yet further includes breaking the breakaway tab 120 off from the cylindrical body 110 at a base 122 of the breakaway tab 120 after the cylindrical body 110 is threaded into the internally threaded structure. In some of these embodiments, the foreign material exclusion plug 100 further includes a flange 112 radially extending from the cylindrical body 110 at the top surface. The flange 112 includes a thread boss 118 facing at least partially in the cylindrical direction, an external thread 117 of the externally-threaded cylindrical structure extends to the thread boss 118, and the structural threaded coupler 200 further includes a flush mount portion 210 adapted to receive the flange 112. In these embodiments, threading the cylindrical body 110 into the internally threaded portion 220 includes applying the force until the thread boss 118 engages an internal thread 222 of the internally threaded portion 220 and locks the foreign material exclusion plug 100 in place relative to the structural threaded coupler 200, and breaking the breakaway tab 120 off from the cylindrical body 110 includes applying the force to the breakaway tab 120 after the thread boss 118 engages and is seated with the internal thread 222 and the cylindrical body 110 is threaded to the desired depth.

In some embodiments, the method 500 still further includes uncoupling the foreign material exclusion plug 100 from the structural threaded coupler 200 by inserting one of an end of a tool, a coin, and the breakaway tab 120 broken off from the cylindrical body 110 into the slot 114 and applying a force to thereto such that the foreign material exclusion plug 100 turns relative to the structural threaded coupler 200.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A foreign material exclusion plug, comprising:
a cylindrical body comprising an externally-threaded cylindrical structure having a top surface;
a slot formed in the top surface of the cylindrical body and extending into the cylindrical body; and
a breakaway tab removably coupled to the top surface of the cylindrical body and extending outwards from the top surface of the cylindrical body,
wherein the breakaway tab is oriented such that the breakaway tab crosses over the slot and is integrally connected to the cylindrical body on one of opposing sides and opposing ends of the slot.

2. The foreign material exclusion plug of claim 1, wherein the breakaway tab is integrally formed with the cylindrical body as a unitary structure.

3. The foreign material exclusion plug of claim 1, wherein the breakaway tab is adapted to break off from the cylindrical body at a base thereof, the base adjoining the top surface of the cylindrical body.

4. The foreign material exclusion plug of claim 3, wherein the breakaway tab is adapted to break off from the cylindrical body upon application of a predetermined force, and wherein the predetermined force is one of a lateral force and a torque force greater than a force required to thread the foreign material exclusion plug into a threaded coupler.

5. The foreign material exclusion plug of claim 1, wherein the slot is adapted to receive at least one of an end of a tool, a coin, and a portion of the breakaway tab broken off from the cylindrical body.

6. The foreign material exclusion plug of claim 1, further comprising a flange radially extending from the cylindrical body at the top surface.

7. The foreign material exclusion plug of claim 6, wherein the flange includes one of a cylindrical structure and a frusto-conical structure.

8. The foreign material exclusion plug of claim 6, wherein the flange includes a thread boss facing at least partially in the cylindrical direction, and wherein an external thread of the externally-threaded cylindrical structure extends to the thread boss.

9. A coupling system, comprising:
a structural threaded coupler including an internally threaded portion comprising an internally-threaded cylindrical structure; and
a foreign material exclusion plug comprising
a cylindrical body comprising an externally-threaded cylindrical structure having a top surface and adapted to thread into the internally-threaded cylindrical structure,
a slot formed in the top surface of the cylindrical body and extending into the cylindrical body, and
a breakaway tab removably coupled to the top surface of the cylindrical body and extending outwards from the top surface of the cylindrical body, the breakaway tab being integrally formed with the cylindrical body as a unitary structure, and being adapted to receive a force to thread the foreign material plug into the structural threaded coupler, and being adapted to break off from the cylindrical body at a base thereof, the base adjoining the top surface of the cylindrical body, wherein the slot is adapted to receive at least one of an end of a tool, a coin, and a portion of the breakaway tab broken off from the cylindrical body for unthreading the foreign material exclusion plug from the structural threaded coupler, wherein the breakaway tab is oriented such that the breakaway tab crosses over the slot and is integrally connected to the cylindrical body on one of opposing sides and opposing ends of the slot.

10. The coupling system of claim 9, wherein the breakaway tab is adapted to break off from the cylindrical body upon application of a predetermined force, and wherein the predetermined force is one of a lateral force and a torque force greater than a force required to thread the foreign material exclusion plug into the structural threaded coupler.

11. The coupling system of claim 9, wherein the foreign material exclusion plug further comprises a flange radially extending from the cylindrical body at the top surface, and the structural threaded coupler further comprises a flush mount portion adapted to receive the flange.

12. The coupling system of claim 11, wherein the flange includes one of a cylindrical structure and a frusto-conical structure, and the flush mount portion includes one of a counterbore with a flat bottomed enlargement of the internally threaded portion and a countersink with a conical enlargement of the internally threaded portion.

13. The coupling system of claim 11, wherein the flange includes a thread boss facing at least partially in the cylindrical direction, an external thread of the externally-threaded cylindrical structure extends to the thread boss, and the thread boss is adapted to engage an internal thread of the internally threaded portion and lock the foreign material exclusion plug in place relative to the structural threaded coupler.

14. The coupling system of claim 13, wherein the breakaway tab is adapted to break off from the cylindrical body upon application of a force while the thread boss is engaged with the internal thread.

* * * * *